United States Patent [19]

Morimoto et al.

[11] Patent Number: 4,531,183

[45] Date of Patent: Jul. 23, 1985

[54] INFORMATION RECORDING MATERIAL

[75] Inventors: Isao Morimoto; Masafumi Nakao; Koichi Mori, all of Fuji, Japan

[73] Assignee: Asahi Kasei Kogyo Kabushiki Kaisha, Osaka, Japan

[21] Appl. No.: 611,394

[22] Filed: May 18, 1984

Related U.S. Application Data

[63] Continuation of Ser. No. 346,187, Feb. 5, 1982, abandoned.

[30] Foreign Application Priority Data

Feb. 23, 1981 [JP] Japan .................................. 56-24218

[51] Int. Cl.³ ............................................ G01D 15/34
[52] U.S. Cl. ................................ 346/135.1; 346/76 L; 430/945; 428/469
[58] Field of Search ........................... 346/76 L, 135.1; 430/945, 348, 495; 428/469, 471, 697, 699, 689, 701, 702, 209

[56] References Cited

U.S. PATENT DOCUMENTS 4,461,807 7/1984 Mori .............................. 346/135.1 X Primary Examiner—Joseph W. Hartary
Attorney, Agent, or Firm—Birch, Stewart, Kolasch & Birch

[57] ABSTRACT

An information recording material comprising a substrate and a metallic recording layer, the metallic recording layer comprising a Bi film containing at least one rare earth element. The information recording material exhibits a remarkably increased sensitivity while maintaining a high S/N ratio. Where the information recording material further comprises at least one stabilizing layer of a metal oxide and/or at least one mixture layer of a metallic compound and a metal, further improvements can be attained with respect to S/N ratio, storage stability and archivability.

16 Claims, 6 Drawing Figures

INFORMATION RECORDING MATERIAL

This application is a continuation, of application Ser. No. 346,187 filed on Feb. 5, 1982 now abandoned.

present invention relates to an information recording material suitable for use in heat mode recording. More particularly, the present invention is concerned with an information recording material which has a remarkably improved sensitivity.

Information storage systems in which information is stored by selective ablation, evaporation, removal or modification of a recording medium irradiated spotwise with a focused beam of a laser or the like having high density or strong energy are known as the so-called heat mode recording process to those skilled in the art.

Conventional recording media or materials used in the heat-mode recording process include inorganic materials or organic materials. For recording information on such recording materials, the layer of the inorganic or organic material is irradiated with a laser beam so that evaporation or deformation in part is effected to form a hole in said layer, or so that a partial chemical change is caused to occur in the layer.

In the case of the partial chemical change, the sensitivity of the recording material is so insufficient that the contrast between the changed areas and the unchanged areas is too low to obtain a high signal-to-noise ratio (hereinafter referred to as "S/N ratio"), and the archivability of the recorded material is too poor to be satisfactory in a practical sense. Meanwhile, in the case of the hole formation, the holes can be formed by either of two methods, i.e., an evaporation method in which part of the recording layer provided on a substrate is evaporated to form holes, and a deformation-removal method in which part of the recording layer sandwiched between two stabilizing layers on a substrate is dispersed to form holes without evaporation of the material of the recording layer. The conventional recording materials used in the evaporation method are relatively good in sensitivity and S/N ratio but defective in storage stability and archivability under a high humidity and in an oxidative atmosphere since the recording layer of the recording material is left exposed to the air so that the evaporation operation can be done. By contrast, the conventional recording materials used in the deformation-removal method are relatively good in storage stability and archivability but defective in sensitivity and S/N ratio. Therefore, neither of the conventional recording materials used in the above-mentioned two methods sufficiently meets the requirements for practical use.

The present inventors have previously made extensive investigations with a view to eliminating the drawbacks accompanying the conventional heat mode recording materials to succeed in attaining some improvements in sensitivity, S/N ratio, storage stability and archivability by providing first and second stabilizing layers sandwiching a metallic recording layer, with the first stabilizing layer being comprised of an auxiliary metal oxide layer and an inorganic compound layer for converting the auxiliary metal oxide layer to a surface-flat glassy material. However, there has still been a demand for a recording material which is further improved especially with respect to sensitivity.

In view of the above, the present inventors have made extensive and intensive research with a view to developing an information recording material having a further improved sensitivity while maintaining a high S/N ratio. As a result, the present inventors have unexpectedly found that a remarkably improved sensitivity of the recording material can be attained, while maintaining a high S/N ratio, by adopting as a recording layer a Bi film containing at least one rare earth element. The present invention has completed based on such a novel finding.

Accordingly, it is an object of the present invention to provide an information recording material which not only has a remarkably improved sensitivity but also is excellent in S/N ratio.

The foregoing and other objects, features and advantages of the present invention will be apparent to those skilled in the art from the following detailed description and appended claims taken in connection with the accompanying drawing in which:

In FIGS. 1 to 6, like portions are designated by like numerals.

The term "rare earth element" as used herein is intended to mean fifteen lanthanide elements, i.e., lanthanum, cerium, praseodymium, neodymium, promethium, samarium, europium, gadolimium, terbium, dysprosium, holmium, erbium, thulium, ytterbium and lutecium; and elements scandium and yttrium.

Hereinafter, the information recording material will be often referred to simply as "recording material".

In accordance with the present invention, there is provided an information recording material comprising a substrate and a metallic recording layer supported by said substrate, the metallic recording layer comprising a Bi film containing at least one rare earth element selected from the group consisting of Sc, Y, La, Ce, Pr, Nd, Pm, Sm, Eu, Gd, Tb, Dy, Ho, Er, Tm, Yb and Lu.

Figure 1:
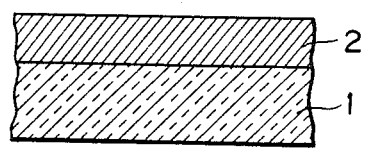
FIG. 1 is a cross-sectional view of one form of an information recording material according to the present invention.

Referring now to FIG. 1, there is shown one form of an information recording material according to the present invention which comprises a substrate 1 and a metallic recording layer 2 supported by the substrate 1.

Figure 2:
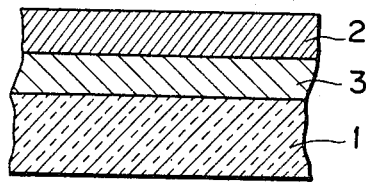
FIG. 2 is a cross-sectional view of another form of an information recording material according to the present invention.

FIG. 2 shows a cross-sectional view of another form of an information recording material according to the present invention. This information recording material comprises a substrate 1 and, superimposed on the substrate in the following order, a first stabilizing layer 3 of a metallic oxide and a metallic recording layer 2.

Figure 3:
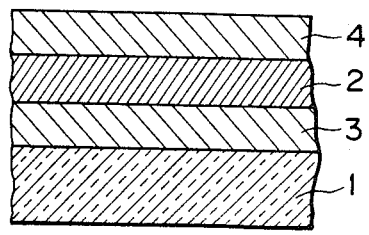
FIG. 3 is a cross-sectional view of still another form of an information recording material according to the present invention.

FIG. 3 shows a cross-sectional view of still another form of an information recording material according to the present invention. This information recording material comprises a substrate 1 and, superimposed on the substrate 1 in the following order, a first stabilizing layer 3 of a metal oxide, a metallic recording layer 2 and a second stabilizing layer 4 of a metal oxide.

Figure 4:
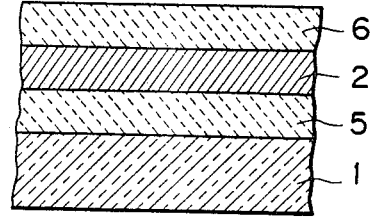
FIG. 4 is a cross-sectional view of a further form of an information recording material according to the present invention.

FIG. 4 shows a cross-sectional view of a further form of an information recording material according to the present invention. This information recording material comprises a substrate 1 and, superimposed on the substrate 1 in the following order, a first mixture layer 5 of a metallic compound and a metal, a metallic recording layer 2 and a second mixture layer 6 of a metallic compound and a metal.

Figure 5:
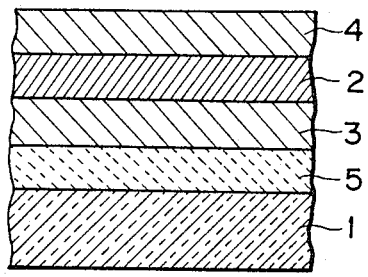
FIG. 5 is a cross-sectional view of still a further form of an information recording material according to the present invention.

FIG. 5 shows a cross-sectional view of still a further form of an information recording material according to the present invention. This information recording material comprises a substrate 1 and, superimposed on the substrate 1 in the following order, a first mixture layer 5 of a metallic compound and a metal, a first stabilizing layer 3 of a metal oxide, a metallic recording layer 2 and a second stabilizing layer 4 of a metal oxide.

Figure 6:
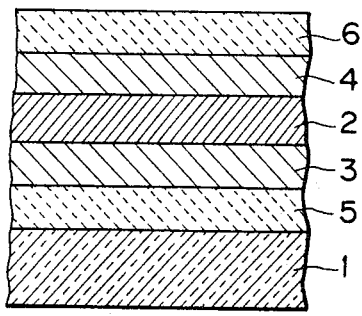
FIG. 6 is a cross-sectional view of still a further form of an information recording material according to the present invention.

FIG. 6 shows a cross-sectional view of still a further form of an information recording material according to the present invention. This information material comprises a substrate 1 and, superimposed on the substrate 1 in the following order, a first mixture layer 5 of a metal compound and a metal, a first stabilizing layer 3 of a metal oxide, a metallic recording layer 2, a second stabilizing layer 4 of a metal oxide and a second mixture layer 6 of a metallic compound and a metal.

As is apparent from the above, according to the present invention, at least one stabilizing layer and/or at least one mixture layer may optionally be provided on at least one of the upper and lower sides of the metallic recording layer. The order of provision of the stabilizing layer and the mixture layer on the at least one of the upper and lower sides of the metallic recording layer is not critical An information recording material of the present invention may further comprise a protective layer as the uppermost layer thereof in order to achieve an improved stability and archivability of the information recording material, to avoid damage of the information recording material when it happens to come in contact with other objects and to protect the information recording material against contamination.

In the Bi film as the metallic recording layer of the present invention, as mentioned before, there should be incorporated at least one rare earth element selected from the group consisting of Sc, Y, La, Ce, Pr, Nd, Pm, Sm, Eu, Gd, Tb, Dy, Ho, Er, Tm, Yb and Lu. Examples of preferred rare earth elements include La, Sm, Gd, Dy and Y. In order to suppress the occurrence of minute disorders in holes formed upon the light beam irradiation and, at the same time increase the sensitivity of the recording material, it is preferred that one or more additional elements than the rare earth elements and Bi be further incorporated into the metallic recording layer. Such elements include, for example, Sb, Sn, Zn, In, Pb, Mg, Au, Ge, Ga, Tl, Cd, As, Rh, Mn, Al, Se and Te. Of these elements, particularly preferred elements are Sb, Sn, In, and Pb.

Too small a content of Bi in the metallic recording layer leads to lowering in the sensitivity as the well as the S/N ratio due to the occurrence of disorders in holes while too large a content of Bi in the metallic recording layer leads to occurrence of disorders in holes and lowering in archivability of the recording material. For these reasons, the content of Bi in the metallic recording layer may preferably be in the range of 50 to 84% in number of atoms, more preferably 60 to 74% in number of atoms.

Although the theoretical analysis of the hole-forming mechanism of heat mode media has not been fully made as yet, the (1) melting point of the metal film of the metallic recording layer, (2) surface tension of the metal when molten and dispersed, and (3) heat scattering from the part of the metal irradiated with a focused beam of laser, etc. are believed to be able to be mentioned as factors affecting the sensitivity of the information recording materials. One of the reasons for the remarkably increased sensitivity of the recording material of the present invention, is believed to be that the above-mentioned factors (2) and (3) are favorably influenced by the incorporation of at least one rare earth element into the Bi film as the metallic recording layer. Particularly with respect to factor (3), it is believed that the thermal conductivity of a metal film as the metallic recording layer is decreased by the incorporation of at least one rare earth element having a relatively low thermal conductivity among metals, so that the heat scattering from the part of the metal irradiated with the focused beam of laser is advantageously suppressed.

The metallic recording layer of the present information recording material may be formed by means of a film-forming technique, for example, vacuum evaporation-deposition, sputtering ion-plating, electroplating, electroless plating or plasma deposition.

As the method for forming the metallic recording layer, the vacuum evaporation-deposition technique is preferred because it is not only simple in operation but also excellent in reproducibility. In order to obtain an information recording material having not only a high sensitivity but also an excellent storage stability and archivability even at high temperatures and high humidities, it is desirable to effect the evaporation-deposition under high vacuum, for example, under a pressure of $10^{-5}$ Torr or less.

The metallic recording layer of the information recording material of the present invention may be either a single layer structure or a multi-layer structure, the single layer or multiple layers comprising Bi and at least one rare earth element, optionally with other element or elements. Illustratively stated, with respect to the multi-layer structure of the metallic recording layer of the present information recording material, there may be employed various forms the multi-layer structure insofar as the multi-layer structure, on a whole, contains Bi and at least one rare earth element, optionally with another element or other elements. For example, there may be a form in which the multiple layers are respectively of the corresponding number of kinds of predetermined elements, a form in which the multiple layers consist of a layer of a single kind of a predetermined element and another layer of two or more kinds of predetermined elements, or the like. Further, the above-mentioned layer of two or more kinds of predetermined elements may have a uniform distribution of composition or any nonuniform distribution of composition in a thickness-wise direction of the layer.

The thickness of the metallic recording layer may be varied according to the use of the information recording material, but is preferably in the range of about 100 to 5,000 Å, more preferably 200 to 600 Å.

In order to obtain a recording material capable of providing excellent and regular profiles of holes upon irradiation with a light beam, a uniform-composition type single layer structure comprised of a layer in which two or more kinds of elements including Bi and at least one rare earth element are uniformly distributed is desirable. Such a uniform-composition type single layer structure can be obtained, for example, by forming on a substrate a multi-layer structure comprised of multiple layers respectively of different kinds of elements including Bi and at least one rare earth element and subsequently heating the substrate with the multi-layer structure formed thereon to diffuse the elements in one another uniformly, followed by cooling. The rare earth elements to be used in the present invention may contain small amounts of impurities as far as the impurities do not exert an adverse effect on the sensitivity of the present information recording material.

As examples of the substrate to be used in the information recording material of the present invention, there can be mentioned aluminum, mica and surface-colored stainless steel. But, it is to be noted that transparency is required of the substrate when recording is effected by laser beam ablation from the lower side of the information recording material, i.e., from the side of the substrate.

In general, it is known that the transparency of substances varies depending on the wavelength or frequency of incident light. When information is recorded on the recording material of the present invention, various light sources having different optical characteristics may be used. Such light sources include a semiconductor laser, argon gas laser, xenon flashlamp and other lasers or lamps having an oscillation wavelength of the visible region or near-infrared region. In the information recording material of the present invention, it is preferred that a substrate having transparency matched with the optical characteristics of the light source used be employed from a viewpoint of a further improvement of sensitivity. In the present information recording material, a material having a light transmittance of about 90% or more to incident light may preferably be used as the substrate when the information material is irradiated with a light beam from the side of the substrate.

Substrates having a sufficient light transmittance to the light emitted from any of the above-mentioned light sources include films and plates of inorganic materials such as glass; and those of organic materials, for example, polymers such as polyester, polypropyrene, polycarbonate, polyvinyl chloride, polyamides, polystyrene and polymethyl methacrylate and modified polymers derived therefrom, copolymers of monomer units of the above polymers and blends thereof. Of such materials of the substrate, especially preferred are films and plates of polyesters or of polymethyl methacrylate. When the smoothness of the surface of the substrate itself has a great influence on the S/N ratio of an information recording material as in the case of a video disk or the like, there may preferably be employed a substrate obtained by coating a separately prepared film or plate with one of the above-mentioned materials, for example, by the spin coating technique.

In the information recording material of the present invention, at least one mixture layer of a metal and a metallic compound may optionally be provided on at least one side of the metallic recording layer. Such a mixture layer contributes to the formation of a better shape of holes on the metallic recording layer and the increase in sensitivity of the information recording material even when the information recording material is irradiated with a beam of light mentioned above from any side, i.e., from the side of the substrate or the side remote from the substrate of the information recording material. The mixture layer serves to prevent the occurrence of disorders in holes on the metallic recording layer and the lowering in sensitivity of the recording material which are often observed when the recording material is irradiated with a light beam from the side of the substrate.

The metal to be used in the mixture layer of the present information recording material, may be any of those capable of forming a layer or film of a mixture with a metal compound. Preferred metals are Al, Si, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, La, Hf, Ta, Re, Ir, Tl, Pb, Bi, Dy, Er, Gd, Nd, Pr, Sm, Mo, Au, Se, and Te. These metals may be used either alone or in combination. Meanwhile, the metallic compound to be used in the mixture layer of the present information recording material, there may be employed any of those capable of forming a layer or film of a mixture with a metal as described above. Preferred metallic compounds are oxides and fluorides of Be, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, Ba, La, Hf, Ta, Re, Ir, Tl, Pb, Bi, Dy, Er, Gd, Nd, Pr, and Sm. More preferred are $Al_2O_3$, $ZrO_2$, $Cr_2O_3$, $GeO_2$, $SiO_2$, $Bi_2O_3$, $As_2O_3$, $Sb_2O_3$, $Ta_2O_3$, $Sm_2O_3$, and $Y_2O_3$. Glass-forming oxides such as $SiO_2$, $GeO_2$ and $Al_2O_3$ are especially useful for preventing the oxidation-deterioration of the metallic recording layer and stabilizing the metallic recording layer since they are excellent in shielding properties due to their amorphous network structures. These metallic compounds may be used either alone or in combination.

The mixture layer of the recording material of the present invention is preferably of such a structure that the metal is dispersed, in the form of minute particles having diameters or sizes smaller than the wave length of a light beam to be employed for recording, in the metallic compound which serves as a dielectric medium. This structure can be obtained relatively easily by employing such a combination of kinds of metal and metallic compound that the free energy of formation of oxide or fluoride of the metal is greater than that of formation of the metallic compound.

The mixture layer can be formed by co-evaporation-deposition or co-sputtering of the metallic compound and the metal as described above which are separately contained in heating vaporization boats or electron beam evaporation crucibles. The mixture layer can alternatively be formed by using a pelletized mixture of the metallic compound and the metal according to a conventional film-forming technique such as electric resistance heating evaporation-deposition, electron beam evaporation-deposition, ion-plating or sputtering. The vacuum evaporation-deposition technique is preferred because it is not only simple in operation but also excellent in reproducibility. From a viewpoint of stability of the mixture layer, it is desirable to effect the deposition under a pressure of $10^{-5}$ Torr or less.

When a mixture layer is provided on the metallic recording layer remote from the substrate and/or between the metallic recording layer and the substrate, the thickness of the mixture layer may be in the range of 50 to 1,000 Å, preferably 100 to 800 Å. The volume percentage of the metal dispersed in the mixture layer may be in the range of 10 to 80%, preferably 20 to 60%.

When two or more mixture layers are provided on the metallic recording layer remote from the substrate and/or between the metallic recording layer and the substrate, the thickness of each mixture layer is not critical as far as the total thickness of the mixture layers is in the range of 50 to 1,000 Å, more preferably 100 to 800 Å. Further, the average volume percentage of the metal or metals dispersed in the mixture layers may be in the range of 10 to 80%, preferably 20 to 60%. If the thickness of the mixture layer and the volume percentage of the metal dispersed in the mixture layer are not within the range mentioned above, a semiconductor laser having a continuous oscillation output of 10 mW or less and a oscillation wavelength of near-infrared region cannot be used as the light source.

In the information recording material of the present invention, at least one stabilizing layer of a metal oxide may optionally be provided on at least one side of the metallic recording layer in order to provide a better shape of holes and, at the same time, improve the stability and archivability of the metallic recording layer.

As the metal oxide to be used in the stabilizing layer, preferred metal oxides are oxides of elements such as Be, B, Mg, Al, Si, Ga, Sc, Ti, V, Cr, Mn, Fe, Co, Ni, Cu, Zn, Li, Ge, As, Sr, Y, Zr, Nb, Tc, Ru, Rh, Pd, Ag, In, Sn, Sb, Ba, Ce, La, Hf, Ta, Re, Ir, Tl, Pb, Bi, Dy, Er, Gd, Nd, Pr and Sm. More preferred are oxides of elements such as Si, Al, Ge, Sb, Zr, Ta, Bi, Pb, Zn, Li, Mg, Ti, La, Ce, Y, Dy, Er, Gd, Hf, Sm, Cr, Nd and Pr. Especially preferred examples of metal oxides are $Al_2O_3$, $GeO_2$, $Sb_2O_3$, $ZrO_2$, $Ta_2O_3$, $Bi_2O_3$, PbO, ZnO, LiO, MgO, $TiO_2$, $La_2O_3$, $CeO_2$, $Y_2O_3$, $Dy_2O_3$, $Er_2O_3$, $Gd_2O_3$, $HfO_2$, and $Sm_2O_3$.

The stabilizing layer of a metal oxide of the information recording material of the present invention may be either of a single layer structure or of a multi-layer structure. Illustratively stated, with respect to the multi-layer structure of the stabilizing layer of the present information recording material, there may be employed various forms of multi-layer structure. For example, there may be a form in which the multiple layers are respectively of the corresponding number of kinds of predetermined metal oxides, a form in which the multiple layers consists of a layer of a single kind of a predetermined metal oxide and another layer of two or more kinds of predermined metal oxides, or the like.

In order to obtain a recording material which is capable of providing a better shape of holes and has a better storage stability and archivability, it is desirable to form the stabilizing layer in the form of a multi-layer structure comprised of multiple layers different in kind of metal oxide.

The stabilizing layer of the metal oxide can be formed by a thin film-forming technique such as vacuum evaporation-deposition, sputtering, ion-plating or plasma deposition. The stabilizing layer of the metal oxide can also be formed by reactive sputtering in which air, oxygen or an oxygen-argon mixture is introduced into the sputtering atmosphere and a plurality of targets containing different single metals or a target containing two or more kinds of metals is used.

Depending upon the kind of thin film-forming techique employed, a suboxide corresponding to the metal oxide may occasionally be formed in the stabilizing layer of a metal oxide in the course of the thin film formation. For example, when a metal oxide such as $GeO_2$ is to be deposited by electron beam evaporation under high vacuum to form a metal oxide layer $GeO_x$ (wherein x is greater than or equal to 1 but smaller than 2) may occasionally be contained in the resulting stabilizing layer of a metal oxide. The presence of suboxide is permissible so long as it presents substantially no problems for the purpose of the present invention. However, in order to prevent such formation of suboxide during the deposition of the stabilizing layer of a metal oxide, the deposition may advantageously be conducted in a low-vacuum atmosphere into which a gas such as oxygen, air or an oxygen-argon mixture is leaking.

The thickness of the stabilizing layer of a metal oxide may be varied depending on the kind of metal oxide employed. However, if the stabilizing layer of a metal oxide is too thick, cracks are apt to develop in the stabilizing layer of a metal oxide. Therefore, when a stabilizing layer is provided on the metallic recording layer remote from the substrate and/or between the metallic recording layer and the substrate, the thickness of the stabilizing layer is preferably 10 to 10,000 Å, more preferably 20 to 300 Å. Meanwhile, when two or more stabilizing layers are provided on the metallic recording layer remote from the substrate and/or between the metallic recording layer and the substrate, the thickness of each stabilizing layer is not critical as far as the total thickness of the mixture layers is in the range of 10 to 10,000 Å, more preferably 20 to 300 Å.

As mentioned above, the information recording material of the present invention may further comprise a transparent uppermost protective layer. This transparent protective layer serves not only to protect the information recording material against a mechanical damage but also to increase the sensitivity of the recording material because the protective layer decreases light reflectivity.

The transparent protective layer to be used in the present recording material may comprise an organic polymer either as the main component or as the sole component.

As examples of organic polymers that may be used in the transparent protective layer, there can be mentioned polyvinylidene chloride, copolymers of vinylidene chloride and acrylonitrile, polyvinyl acetate, polyimides, polyvinyl cinnamate, polyisoprene, polybutadiene, polystyrene, polymethyl methacrylate, polyurethanes, polyvinyl butyral, fluororubbers, polyamides, polyesters, epoxy resins, cellulose acetate and terpolymers of vinyl acetate-vinyl butyral-vinyl alcohol; modified polymers thereof; and copolymers of monomer units of the above polymers. They may be used either alone or in mixture. Polyesters, fluororubbers and terpolymers of vinyl acetate-vinyl butyral-vinyl alcohol are especially preferred.

A silicone oil, an antistatic agent, and a crosslinking agent for improving film strength and antistatic properties may be added to the organic polymer for the transparent protective layer. If desired, the transparent protective layer may be of a multi-layer structure.

The transparent protective layer can be formed by the coating of a coating composition containing an organic polymer dissolved in a suitable solvent, or by the lamination of a thin film of an organic polymer. The thickness of the transparent protective layer is preferably in the range of 0.1 to 10μ.

The recording material according to the present invention are excellent in sensitivity, storage stability and archivability as well as shape of holes to be formed upon irradiation with a light beam and, hence, S/N ratio.

Since the recording material of the present invention has a capability of forming thereon a minute pattern upon irradiation with a light beam either from the side of the substrate or from the side remote from the substrate, the material, after being subjected to pattern formation, can also be used as a mask through which a photoresist composition is exposed to light to form a resist useful in the production of a master plate for a replica of a video disk.

Information may be recorded on the information recording material of the present invention by the method in which the recording material is spot-wise or continuously irradiated with a laser beam; the method in which the recording material is irradiated with a laser beam having a high intensity or with short pulses generated by a xenon flashlamp through a mask having an appropriate contrast, such as a chromium mask, dry silver film or diazo film, to form images; or the like.

The following Examples are given to illustrate the present invention in more detail but should not be construed as limiting the scope of the invention. In the following Examples, the term "packing ratio" is intended to mean a volume percentage of a metal dispersed in a mixture layer.

EXAMPLE 1

Comparative Example 1

A smooth surface-having polymethyl methacrylate (hereinafter referred to as "PMMA") plate having a thickness of 1.1 mm prepared by casting was machined into a disk of 30 cm in diameter. The disk was so set in a vacuum deposition equipment that the disk could be rotated in the central portion of the equipment. The equipment included three heating vaporization boats and an electron beam vacuum evaporation apparatus having five crucibles.

Bi, Sm and Cr were separately put in the heating vaporization boats, and $TiO_2$ and $SiO_2$ were separately put in two of the crucibles of the electron beam vacuum evaporation apparatus. The equipment was pumped down to a vacuum of $2 \times 10^{-6}$ Torr and the disk was rotated at 120 rpm. $TiO_2$ and Cr were coevaporation-deposited on the disk to form a mixture layer having a thickness of 200 Å and a packing ratio of 0.4. $SiO_2$ was subsequently deposited on the mixture layer to form a first stabilizing layer having a thickness of 100 Å. Then, a 300 Å-thick film of Bi and a 100 Å-thick film of Sm were deposition-formed in sequence on the first stabilizing layer to form a metallic recording layer. Subsequently, a second stabilizing layer of $SiO_2$ having a thickness of 100 Å was deposition-formed on the metallic recording layer to obtain Recording material E.

Substantially the same procedures as mentioned above were repeated to prepare Recording materials B to D except that the mixture layer of $TiO_2$ and Cr was omitted in Recording material D; the mixture layer of $TiO_2$ and Cr and the second stabilizing layer of $SiO_2$ were omitted in Recording material C; the mixture layer of $TiO_2$ and Cr and the first and second stabilizing layers of $SiO_2$ were omitted and only the metallic recording layer of Bi and Sm was deposition-formed on the disk in Recording material B.

A comparative Recording material A was prepared in substantially the same manner as described with respect to the preparation of Recording material B except that a 100 Å-thick film of Sn was deposition-formed instead of the 100 Å-thick film of Sm.

The thickness of a film or layer being deposition-formed on the disk was monitored by means of a quartz oscillator, and controlled automatically in the order of the materials to be deposited in sequence in accordance with a program. The deposition of all the above-mentioned films was completed in two minutes.

A semiconductor laser beam modulated to have a pulse width of 500 nsec was concentrated to $1\mu$ in beam diameter by means of a lens, and applied to the metallic recording layer of the so prepared recording disk being rotated at 450 rpm to effect recording. The irradiation with the semiconductor laser beam was effected from the side remote from the substrate. Elliptical holes of about $1\mu$ in length of minor axis were formed in the areas where the metallic recording layer was irradiated with the laser beam. The threshold intensity (sensitivity) of a laser beam capable of producing a hole in the recording layer of the disk was examined at the surface of the recording disk. The C/N ratio ("carrier-to-noise ratio", which can be converted to "S/N ratio") ["Television Picture Engineering Handbook" page 298, published by the Institute of Television Engineers of Japan, Japan (1980)] of the disks in which information was recorded was examined by means of a spectrum analyzer to which a 1 MHz standard signal had been given.

Recording materials A to E were allowed to stand for 10 days in a thermo-hygrostat which was kept at a temperature of 60° C. and a relative humidity of 70%. After 10 days, the sensitivity and C/N ratio of each recording material were examined in substantially the same manner as mentioned above.

The results obtained are shown in Table 1.

As is apparent from Table 1, the threshold intensity of a laser beam capable of producing a hole in the metallic recording layer of the comparative Recording material A was 5.0 mW while the threshold intensity of the Recording material B was 4.0 mW. That is, an increase of 1.0 mW in sensitivity was achieved by incorporating a rare earth element, Sm, into the metallic recording layer of the recording material. Both the comparative Recording material A and the Recording material B decreased in sensitivity and C/N ratio respectively by 3.0 mW and 10 dB after subjected to the accelerated storage or aging test at a temperature of 60° C. and a relative humidity of 70% for 10 days.

Meanwhile, the Recording material C having a stabilizing layer and the Recording material D having two stabilizing layers showed the same sensitivity as that of the Recording material B when they were examined immediately after the preparation thereof. In the Recording materials C and D, however, a better shape of holes was observed as compared with that in the Recording material B, and the Recording materials C and D were increased in C/N ratio by 5 dB and 7 dB, respectively, over that of the Recording material B. With respect to the Recording materials C and D, the decrease in sensitivity after they were subjected to the accelerated storage or aging test was small as compared with that of the Recording material B having no stabilizing layer. That is, the respective sensitivities of the Recording materials C and D were decreased only by 2.0 mW and 1.0 mW. Particularly, the Recording material D having stabilizing layers on both the upper and lower sides of the metallic recording layer showed an excellent storage stability, i.e., a decrease of only 1.0 mW in sensitivity and a decrease of only 2 dB in C/N ratio.

The Recording material E having two stabilizing layers as in the Recording material D which indicated the best photosensitive characteristics and archivability among the Recording materials A to D and having additionally a mixture layer of $TiO_2$ and Cr between the substrate and the first stabilizing layer showed an increase of 0.5 mW in sensitivity and an increase of 5 dB in C/N ratio over the Recording material D. Particularly, the holes formed on the Recording material E had a better shape of holes as compared with the holes formed on the Recording material D. The Recording material E showed a decrease of 1.0 mW in sensitivity but no change in C/N ratio after subjected to the accelerated storage or aging test.

ing layer containing a rare earth element, Ce, was 4.2 mW while the threshold intensity for the comparative recording material having the metallic recording layer not containing Ce was 4.8 mW. That is, by incorporating a rare earth element, Ce, into the metallic recording layer the sensitivity of the recording material was increased by 0.6 mW. Both the present recording material and the comparative recording material had a good shape of holes formed thereon.

EXAMPLE 3

Comparative Example 3

Bi, La and Ge were separately put in three heating vaporization boats, and $Al_2O_3$ and $Sm_2O_3$ were sepa-

TABLE 1

| Recording Material | Composition | Immediately after preparation | | After the 10-day accelerated aging test (temperature 60° C.; relative humidity 70%) | |
|---|---|---|---|---|---|
| | | Threshold intensity (mW) | C/N ratio (dB) | Threshold intensity (mW) | C/N ratio (dB) |
| Comparative | | | | | |
| A | PMMA/Bi/Sn | 5.0 | 30 | 8.0 | 20 |
| Present invention | | | | | |
| B | PMMA/Bi/Sm | 4.0 | 30 | 7.0 | 20 |
| C | $PMMA/SiO_2/Bi/Sm$ | 4.0 | 35 | 6.0 | 32 |
| D | $PMMA/SiO_2/Bi/Sm/SiO_2$ | 4.0 | 37 | 5.0 | 35 |
| E | $PMMA/TiO_2.Cr/SiO_2/Bi/Sm/SiO_2$ | 3.5 | 42 | 4.5 | 42 |

EXAMPLE 2

Comparative Example 2

Bi, Ce, Au were separately put in three heating vaporization boats, and MgO and Sn were separately put in two of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. MgO and Au were coevaporation-deposited on the disk to form a first mixture layer having a thickness of 150 Å and a packing ratio of 0.6. Then, a 200 Å-thick film of Bi, a 50 Å-thick film of Sn and a 50 Å-thick film of Ce were deposition-formed in sequence on the mixture layer to form a metallic recording layer. A second mixture layer of MgO and Au having a thickness of 150 Å and a packing ratio of 0.6 was coevaporation-deposition-formed on the metallic recording layer to obtain a recording material of the present invention.

Substantially the same procedures as mentioned above were repeated to prepare a comparative recording material except that a metallic recording layer not containing Ce was formed, that is, as the metallic recording layer a 200 Å-thick film of Bi and a 50 Å-thick film of Sn were deposition-formed in sequence on the mixture layer.

The present recording material and comparative recording material thus prepared were separately irradiated with a semiconductor laser beam to effect recording in substantially the same manner as in Example 1 except that the irradiation with the laser beam was effected from the side of the substrate. With respect to each of the present recording material and comparative recording material, the threshold intensity of the laser beam capable of producing a hole in the metallic recording layer was examined in the same manner as in Example 1. As a result, the threshold intensity for the present recording material having the metallic recordrately put in two of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. $Al_2O_3$ and Ge were coevaporation-deposited on the disk to form a first mixture layer having a thickness of 150 Å and a packing ratio of 0.6. Then, a 50 Å-thick film of $Sm_2O_3$ was deposition-formed on the first mixture layer to form a first stabilizing layer. Bi and La were coevaporation-deposited on the first stabilizing layer so that the thickness ratio of the Bi film to the La film became 5:1, thus forming a metallic recording layer of 300 Å in thickness. Subsequently, a second stabilizing layer of $Al_2O_3$ having a thickness of 50 Å was formed by means of vacuum evaporation to obtain a recording material of the present invention.

Substantially the same procedures as mentioned above were repeated to prepare a comparative recording material except that only Bi was deposited on the first stabilizing layer to form a metallic recording layer having a thickness of 300 Å.

The present recording material and comparative recording material thus prepared were separately irradiated with a semiconductor laser beam to effect recording in substantially the same manner as in Example 2. With respect to the present recording material and comparative recording material, the threshold intensity of the laser beam capable of producing a hole in the metallic recording layer was examined in the same manner as in Example 1. As a result, it has been found that the threshold intensity for the present recording material having the metallic recording layer containing a rare earth element, La, was 3.2 mW while the threshold intensity for the comparative recording material having the metallic recording layer containing no rare earth element was 4.8 mW. That is, by incorporating a rare earth element, La, into the metallic recording layer, the sensitivity of the recording material was increased by 1.6 mW.

EXAMPLE 4

Comparative Example 4

Sb, Gd and Ni were separately put in three heating vaporization boats, and GeO$_2$, SiO$_2$ and Bi were separately put in three of the crucibles of the electron beam vacuum evaporation apparatus in the same vacuum deposition equipment as used in Example 1.

The equipment was pumped down to a vacuum of $2 \times 10^{-6}$ Torr and a disk made of PMMA was rotated at 120 rpm. SiO$_2$ and Ni were coevaporation-deposited on the disk to form a first mixture layer having a thickness of 300 Å and a packing ratio of 0.3. Subsequently, GeO$_2$ was deposited on the first mixture layer to form a first stabilizing layer having a thickness of 100 Å. A 50 Å-thick film of Gd, a 50 Å-thick film of Sb and a 200 Å-thick film of Bi were deposition-formed in sequence on the first stabilizing layer to form a metallic recording layer. Then, GeO$_2$ was deposited on the metallic recording layer to form a second stabilizing layer having a thickness of 100 Å. A second mixture layer of SiO$_2$ and Ni having a thickness of 300 Å and a packing ratio of 0.3 was formed on the second stabilizing layer by means of coevaporation deposition.

Substantially the same procedures as mentioned above were repeated to prepare a comparative recording material except that the incorporation of Gd into the metallic recording layer was omitted.

The present recording material and comparative recording material thus prepared were separately irradiated with a semiconductor laser beam to effect recording in substantially the same manner as in Example 2. With respect to the present recording material and comparative recording material, the threshold intensity of the laser beam capable of producing a hole in the metallic recording layer was examined in the same manner as in Example 1. As a result, the threshold intensity for the present recording material having the metallic recording layer containing a rare earth element, Gd, was 3.0 mW while the threshold intensity for the comparative recording material having the metallic recording layer containing no rare earth element was 4.5 mW. That is, by incorporating a rare earth element, Gd, into the metallic recording layer, the sensitivity of the recording material was increased by 1.5 mW. Both the present recording material and the comparative recording material had a good shape of holes formed thereon.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An information recording material having a high sensitivity, S/N ratio and archivability comprising a substrate and a metallic recording layer having an upper and lower side supported by said substrate, said metallic recording layer comprising a Bi film containing at least one rare earth element selected from the group consisting of Sc, Y, La, Ce, Pr, Nd, Pm, Sm, Eu, Gd, Tb, Dy, Ho, Er, Tm, Yb and Lu, the content of Bi in said metallic recording layer being in the range of 50 to 84% in number of atoms.

2. An information recording material according to claim 1, wherein said Bi film further contains at least one element selected from the group consisting of Sb, Sn, Zn, In, Pb, Mg, Au, Ge, Ga, Tl, Cd, As, Rh, Mn, Al, Se and Te.

3. An information recording material according to claim 1, which further comprises at least one stabilizing layer of a metal oxide provided on at least one of said upper and lower sides of said metallic recording layer.

4. An information recording material according to claim 3, wherein said stabilizing layer of metal oxide comprises an oxide of at least one metal selected from the group consisting of Be, B, Mg, Al, Si, Ga, Sc, Ti, V, Cr, Mn, Fe, Co, Ni, Cu, Zn, Li, Ge, As, Sr, Y, Zr, Nb, Tc, Ru, Rh, Pd, Ag, In, Sn, Sb, Ba, Ce, La, Hf, Ta, Re, Ir, Tl, Pb, Bi, Dy, Er, Gd, Nd, Pr and Sm.

5. An information recording material according to claim 3, wherein said Bi film further contains at least one element selected from the group consisting of Sb, Sn, In and Pb.

6. An information recording material according to claim 3, wherein said stabilizing layer of metal oxide comprises an oxide of at least one metal selected from the group consisting of Si, Al, Ge, Sb, Zr, Ta, Bi, Pb, Zn, Li, Mg, Ti, La, Ce, Y, Dy, Er, Gd, Hf, Sm, Cr, Nd and Pr.

7. An information recording material according to claim 1, which further comprises at least one stabilizing layer of a metal oxide and at least one mixture layer of a metallic compound and a metal provided on at least one of said upper and lower sides of said metallic recording layer.

8. An information recording material according to claim 7, wherein said stabilizing layer of metal oxide comprises an oxide of at least one metal selected from the group consisting of Be, B, Mg, Al, Si, Ga, Sc, Ti, V, Cr, Mn, Fe, Co, Ni, Cu, Zn, Li, Ge, As, Sr, Y, Zr, Nb, Tc, Ru, Rh, Pd, Ag, In, Sn, Sb, Ba, Ce, La, Hf, Ta, Re, Ir, Tl, Pb, Bi, Dy, Er, Gd, Nd, Pr and Sm.

9. An information recording material according to claim 7, wherein said metallic compound in said mixture layer is at least one metallic compound selected from the group consisting of oxides and fluorides of a metal selected from Be, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, Ba, La, Hf, Ta, Re, Ir, Tl, Pb, Bi, Dy, Er, Gd, Nd, Pr and Sm.

10. An information recording material according to claim 7, wherein said metal in the mixture layer is at least one metal selected from the group consisting of Al, Si, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, La, Hf, Ta, Re, Ir, Tl, Pb, Bi, Dy, Er, Gd, Nd, Pr, Sm, Mo, Au, Se and Te.

11. An information recording material according to claim 7, wherein said stabilizing layer of metal oxide comprises an oxide of at least one metal selected from the group consisting of Si, Al, Ge, Sb, Zr, Ta, Bi, Pb, Zn, Li, Mg, Ti, La, Ce, Y, Dy, Er, Gd, Hf, Sm, Cr, Nd and Pr.

12. An information recording material according to claim 7, wherein said metallic compound in said mixture layer is at least one metallic compound selected from the group consisting of Al$_2$O$_3$, ZrO$_2$, Cr$_2$O$_3$, GeO$_2$, SiO$_2$, Bi$_2$O$_3$, As$_2$O$_3$, Sb$_2$O$_3$, Ta$_2$O$_3$, Sm$_2$O$_3$ and Y$_2$O$_3$.

13. An information recording material according to claim 1, which further comprises at least one mixture layer of a metallic compound and a metal provided on at least one of said upper and lower sides of said metallic recording layer.

14. An information recording material according to claim 13, wherein said metallic compound in said mixture layer is at least one metallic compound selected from the group consisting of oxides and fluorides of a metal selected from Be, B, Mg, Al, Si, Ca, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, Ba, La, Hf, Ta, Re, Ir, Tl, Pb, Bi, Dy, Er, Gd, Nd, Pr and Sm.

15. An information recording material according to claim 13, wherein said metal in the mixture layer is at least one metal selected from the group consisting of Al, Si, Sc, Ti, V, Cr, Mn, Fe, Co, Ni, Cu, Zn, Ga, Ge, As, Sr, Y, Zr, Nb, Tc, Ru, Rh, Pd, Ag, In, Sn, Sb, La, Hf, Ta, Re, Ir, Tl, Pb, Bi, Dy, Er, Gd, Nd, Pr, Sm, Mo, Au, Se and Te.

16. An information recording material according to claim 13, wherein said metallic compound in said mixture layer is at least one metallic compound selected from the group consisting of $Al_2O_3$, $ZrO_2$, $Cr_2O_3$, $GeO_2$, $SiO_2$, $Bi_2O_3$, $As_2O_3$, $Sb_2O_3$, $Ta_2O_3$, $Sm_2O_3$, and $Y_2O_3$.

* * * * *